United States Patent [19]

Hazenbroek et al.

[11] Patent Number: 5,766,063
[45] Date of Patent: Jun. 16, 1998

[54] EVISCERATOR

[75] Inventors: Jacobus E. Hazenbroek, Numansdorp; Johannes T. J. Van Ham, Dordrecht; Bastiaan Verrijp, Numansdorp; Daniel L. Machloet, Sommelsdijk, all of Netherlands

[73] Assignee: Systemate Holland, B.V., Numansdorp, Netherlands

[21] Appl. No.: 780,248

[22] Filed: Jan. 8, 1997

[30] Foreign Application Priority Data

Oct. 30, 1996 [EP] European Pat. Off. ............ 96203009

[51] Int. Cl.$^6$ ............................................ A22C 21/06
[52] U.S. Cl. ............................................ 452/117
[58] Field of Search ............................ 452/117, 118, 452/106

[56] References Cited

U.S. PATENT DOCUMENTS

| | | |
|---|---|---|
| 140,193 | 1/1873 | Lynn . |
| D. 256,802 | 9/1980 | Hazenbroek . |
| D. 276,209 | 11/1984 | Hazenbroek . |
| 1,984,562 | 12/1934 | Ashby . |
| 2,508,957 | 5/1950 | Lynn . |
| 2,533,445 | 12/1950 | Finney . |
| 2,547,608 | 4/1951 | Toti et al. . |
| 2,774,101 | 12/1956 | Ograbisz . |
| 2,975,469 | 3/1961 | Viscolosi . |
| 3,474,492 | 10/1969 | Viscolosi . |
| 3,555,593 | 1/1971 | Scheier . |
| 3,653,093 | 4/1972 | Scheier . |
| 3,663,991 | 5/1972 | Harben, Jr. . |
| 3,685,096 | 8/1972 | Harben, Jr. . |
| 3,711,897 | 1/1973 | Viscolosi . |
| 3,879,803 | 4/1975 | Verbakel . |
| 3,886,635 | 6/1975 | Meyn ......................... 452/117 |
| 3,902,221 | 9/1975 | Harben et al. . |
| 3,958,303 | 5/1976 | Scheier et al. . |
| 3,979,793 | 9/1976 | Hazenbroek . |
| 3,992,752 | 11/1976 | Harben et al. . |
| 4,019,222 | 4/1977 | Scheier et al. . |
| 4,467,498 | 8/1984 | Graham et al. . |

FOREIGN PATENT DOCUMENTS

| | | |
|---|---|---|
| 2 239 947 | 3/1975 | European Pat. Off. . |
| 0 094 724 | 11/1983 | European Pat. Off. . |
| 0 400 696 | 12/1990 | European Pat. Off. . |
| 0 497 014 | 8/1992 | European Pat. Off. . |
| 0 539 134 | 4/1993 | European Pat. Off. . |
| 0 587 253 A2 | 9/1993 | European Pat. Off. . |
| 0 587 253 | 3/1994 | France . |
| 7 215 768 | 11/1972 | Netherlands . |
| 356 442 | 9/1931 | United Kingdom . |

OTHER PUBLICATIONS

Photographs of eviscerator tool of United Investment Casting Co.

Primary Examiner—Willis Little
Attorney, Agent, or Firm—Thomas, Kayden, Horstemeyer & Risley

[57] ABSTRACT

Device for removing the viscera from the carcass of a slaughtered bird, comprising means for holding the carcass with its vent upward, means for gripping the gullet, said gripping means comprising at least two jaw members which are movable towards each other to fixedly and positively clamp the gullet between them, means for engaging under the viscera and means for moving the gripping means and the engaging means downward inside the carcass to the area of the gullet and operating means to move them subsequently in an active position upwards to eviscerate the viscera, wherein the gripping means and the engaging means are formed by one and the same scoop member which is hingedly connected to the lower end of a carrier bar means, wherein the gripping means and the scoop means are arranged for being simultaneously moved between a non-active position and an active position and vice versa.

30 Claims, 15 Drawing Sheets

EVISCERATOR

CROSS REFERENCE

Applicants claim priority of European Patent Application Ser. No. 96 203 009.4, filed Oct. 30, 1996.

FIELD OF THE INVENTION

This invention relates to a device for removing the viscera from the carcass of a slaughtered bird, in particular a chicken.

BACKGROUND OF THE INVENTION

In the industry, it is common practice to eviscerate the cluster or package (or a part thereof) of inner organs of the animal, such as the glandular stomach, gizzard, gall bladder, pancreas and intestines, in short the organs of the digestive system, as well as other organs, such as the liver, the heart and the lungs. In this description such a package (or part thereof) is generally indicated by the expression viscera. The evisceration can take place automatically, usually after the birds, which are hanging upside down by their legs from shackles that are conveyed by an overhead conveyor, have been decapitated and an incision has been made at the vent to facilitate the entry of the eviscerator into the carcass.

The known eviscerators are arranged on a carousel, driven at a speed corresponding to that of the overhead conveyor, wherein "carousel", is to be understood in a broad sense: it can for example follow a circular path or an elliptic path. The carousel is provided with holding means for holding the carcasses in a correct position during evisceration and with means for moving the actual eviscerator downwards and upwards, to perform an eviscerating stroke. Such known eviscerators can have the form of a spoon or scoop, with an open surface —such as in the form of a bracket—or a closed surface. The scoop is mounted on a bar-like carrier which is manipulated to have the scoop follow a curved path during its downward travel inside the carcass. As shown in Dutch patent application 72.15768, the scoop may comprise a V-shaped slot and be hinged to the lower end of the carrier bar so that it can be rotated about a substantially horizontal hinge axis from a non-active position, in the extension of the carrier bar, to an active position, perpendicular to the carrier bar, by means of operating means such as a lever assembly extending along the carrier bar. The scoop is manipulated to engage the gullet between the crop and the proventriculus of the bird. The gullet is then received in the V-slot. By subsequent seizing of the scoop in its still active position, the scoop pushes the organs located above it along upwards and through the vent opening to outside the carcass. During this evisceration the gullet of the bird remains attached to the crop and the stomachs. It is also, however, attached at its other end to the neck, as a result of which the (elastic) gullet is stretched during evisceration and tends to slip through the V-slot in the scoop. After the viscera has been removed from the carcass it will still be connected to the bird through the gullet. This gullet has thereafter to be cut with a knife by a slaughterman, which is a difficult thing to do because of the toughness of the gullet.

An improvement on this is described in European patent application 0,587,253, in which document an eviscerator is disclosed which has both a scoop and gullet clamping jaws. The scoop and the jaws are arranged at the lowest end of the carrier bar. The scoop is hinged to the carrier bar to enable rotation about a horizontal axis perpendicular to the plane of symmetry of the bird and can be operated by means of an operating lever rod extending along the carrier bar. One of the jaws is hinged to the lowest end of the carrier bar so as to enable its rotation about a horizontal axis, perpendicular to the hinge axis of the scoop, towards and away from the other, fixed jaw. The carrier bar is provided with a spring biassed, separate lever rod for operating the jaws. When the jaws have arrived at the neck region of the carcass, the jaw operating lever rod is activated to widen the split between the jaws to enable the gullet to enter into that split. At the same time, the scoops are rotated about their hinge axis, during which movement the gullet also enters a slit in the scoop. Then the spring-biassing force is applied to the jaw operating lever rod to close the jaws and thereby positively fix the gullet. During evisceration the gullet will break off beneath the jaws, but will remain fixed with its higher part to the jaws and, indirectly, to the scoop.

A drawback to this known arrangement is that the eviscerator is rather complex, with many components and moving parts. This makes the known eviscerator vulnerable to malfunctioning, not in the least because it is difficult to clean the moving parts sufficiently during their return movement for a next operation cycle. It is true, though, that in this European patent application a simplification is suggested by the mention of the possibility that the jaws themselves form the actual scoop, but it is not illustrated how this can be achieved.

SUMMARY OF THE INVENTION

An object of the present invention is to provide a solution to this problem.

A further object of the invention is to provide an eviscerator which functions in a reliable way for a long time and which is easy to clean.

Yet another object of the invention is to provide an eviscerator which can be smoothly introduced into the carcass of a slaughtered bird.

Still another object of the invention is to provide an eviscerator which can be smoothly moved downward inside the cavity of the carcass of a slaughtered bird.

A further object of the invention is to provide an eviscerator assembly, in which the mounting of the eviscerators can be simple.

These and other objects are achieved with the measures described in the accompanying claims.

From one aspect, the invention provides a device for removing the viscera from the carcass of a slaughtered bird, comprising a carrier bar means, means for holding the carcass with its vent upward, means for positively gripping the gullet, said gripping means comprising at least two jaw members which are movable towards each other to fixedly and positively clamp the gullet between them, means for engaging under the viscera and means for moving the gripping means and the engaging means downward inside the carcass to the area of the gullet and for moving them subsequently in an active position upwards to eviscerate the viscera, wherein the gripping means and the engaging means are formed by one and the same scoop member which is pivotally connected to the lower end of the carrier bar means, wherein the gripping means and the engaging means are arranged for being simultaneously moved between a non-active position and an active position and vice versa.

Thus, one operating means for the operation of both the gripping means and the scoop means may suffice, so that the number of moving parts may be kept to a minimum. As a consequence, the operation of the eviscerator of the invention is reliable and can be maintained so for a long period of time.

Preferably, the gripping means and the engaging means are arranged for simultaneously performing a common rotational movement.

Preferably, the arrangement is such that the common rotation takes place about an axis or about axes which extends or extend substantially perpendicular to the plane of symmetry of the carcass to be eviscerated.

In a further preferred embodiment the scoop member comprises at least two scoop parts forming two jaw members and each being pivotally connected to the carrier bar means, which carrier bar means extends substantially vertically, the pivot axes of said scoop parts including an upwardly opening angle of less than 180°, as viewed in a substantially vertical plane of projection. In this arrangement the scoop parts, each forming a gripping means or jaw member as well as an engaging means performing a single common rotational movement, will automatically approach each other during the movement from the nonactive to the active position, thus reducing the space between their facing edges to enable clamping of the gullet between them.

Preferably, the edges of the scoop parts that are facing each other extend substantially perpendicular to the respective hinge axes of the scoop part. If, in their nonactive position, the scoop parts extend substantially vertically downward from their hinges, and if they, in their active position, extend substantially horizontally from their hinges, the said edges will at least almost abut each other in the latter position, thus providing a firm and positive gullet clamping force.

Preferably, the carrier bar means is substantially curved as seen in a vertical plane parallel to the plane of symmetry of the carcass or perpendicular to the direction of transport of the carcass, wherein said scoop parts have their active position at the concave side of the bar member. This configuration fits that of the inner boundaries of the cavity of the carcass, thus facilitating the movement of the carrier bar means into the carcass, in particular in the arrangement in which the moving means and the holding means are arranged so as to enable the scoop member to be inserted into the carcass along the inner side of the breast of the carcass and to be seized along the inner side of the back of the carcass.

In connection herewith, the convex side of the carrier bar means is preferably provided with a shield member for screening off the scoop parts in their non-active position.

In a further preferred embodiment the operating means for the scoop member comprise lever means which extend along the carrier bar means and are hingedly connected at their lower end to portions of the scoop parts that are located at the side of their pivot axes facing away from the gripping means and engaging means. Advantageously, the lever means comprises one lever for all scoop parts.

According to a further aspect of the invention the holding means comprise means for engaging the back of the carcass and means for engaging the front of the carcass and further comprise means for canting the carcass during the downward and upward movement of the scoop member. This arrangement makes it possible to positively cant the carcass while the scoop member can travel into and inside the carcass along the required path, so that the moving means for the scoop member and its suspension can be kept simple. Preferably, the moving means comprise means for moving the scoop member substantially vertically along a straight line.

Preferably, the canting means are arranged for canting the carcass about an axis which is located below the carcass body, preferably near the neck portion of the carcass. In other words, the canting movement takes places about an axis which is located at the side of the carcass opposite the side of entry of the scoop member into the carcass.

Advantageously, the scoop member is connected to the moving means to allow it to be resiliently urged out of the way by carcass parts. As a result, it can pass easily upwards along the inner side of the spine and the connected ribs.

The device of the invention further preferably comprises means for relating the activation of the canting means to the activation of the moving means and/or operating means for the scoop member, which relating means preferably are adapted for activating the canting means to cant the back of the carcass slightly away from the scoop member when the latter arrives at the midriff.

According to yet another aspect of the invention an assembly is provided which comprises a plurality of the eviscerating devices described above, the devices being arranged on a carousel for being moved along a roundgoing path, wherein the devices are provided with cams and the carousel is provided with cam curves or tracks, cooperating with said cams, to operate the several different parts of the devices at specific locations along the path, wherein the cam curves for the holding means comprise a stand-by trajectory in which the holding means are brought in an non-active position, wherein the cam curve for the operating means for the scoop member comprises a trajectory in which the scoop member is brought into an active position, which trajectory partly coincides with said stand-by trajectory.

Due to this arrangement, the gullet will remain clamped in the scoop member for a short time while the carcass can be removed from the carousel, so that the clamped portion of the gullet and the carcass travel along deviating paths, as a consequence of which the viscera—which is still connected to the carcass through the abdomen fat—remains clear from the outside of the carcass and the outside of the carcass does not become contaminated by the organs.

The viscera can subsequently be kept at a distance from the carcass by means of a guiding and spacing means which extends along the path of travel of the carcasses, for instance in the way as is disclosed in Belgian patent 813,138. The viscera remains attached to the carcass by means of the abdominal fat or the like, so that there is still a univocal connection between a carcass and the viscera.

This makes it possible to visually inspect the viscera in an inspection station to determine whether the bird concerned is fit for consumption. In such an inspection station possible irregularities in the viscera can be noticed and the corresponding carcass can be removed from the carcass conveyor. Inspection of the carcass is usually done by taking a look from above, into the vent of the carcass, often by simultaneously gripping the carcass to facilitate the inside inspection of the carcass.

A further object of the application is to improve on this. This improvement is achieved in that the aforementioned assembly or the like comprises an overhead conveyor for shackles for the legs of the carcasses of poultry, said conveyor extending along an incoming trajectory to bring the shackles to the carousel, along at least a part of said roundgoing path and subsequently along an outgoing path diverging from said roundgoing path to move the shackles away from the carousel, the assembly further comprising tilting means located at the outgoing path for tilting the carcasses depending from the shackles towards an inclined orientation while they are moved along the conveyor.

In the assembly according to this invention the carcasses are automatically brought into an orientation in which their inside is easily inspectable by an inspector, who will have his hands free to inspect the viscera, which are still connected to the carcass through the abdomen fat.

Preferably, the assembly comprises support means located at the outgoing path for supporting the carcasses in their tilted orientation during their continued transportation. As a result, the carcass will remain in its inspectable orientation for some time.

Preferably, the tilting means are arranged to tilt the carcasses such that their lower end is moved towards the side facing away from the carousel. Due to this the viscera hanging down from the peritoneum and the tilted carcass will remain spaced from each other, thus preventing the contamination of the outside of the carcass by the viscera.

Advantageously, the tilting means are arranged to tilt the carcasses into an approximate horizontal orientation.

Preferably, the tilting means and the support means are stationary.

BRIEF DESCRIPTION OF THE DRAWINGS

The invention will now be illustrated with reference to the accompanying drawings, in which.

DETAILED DESCRIPTION

Figure 1:
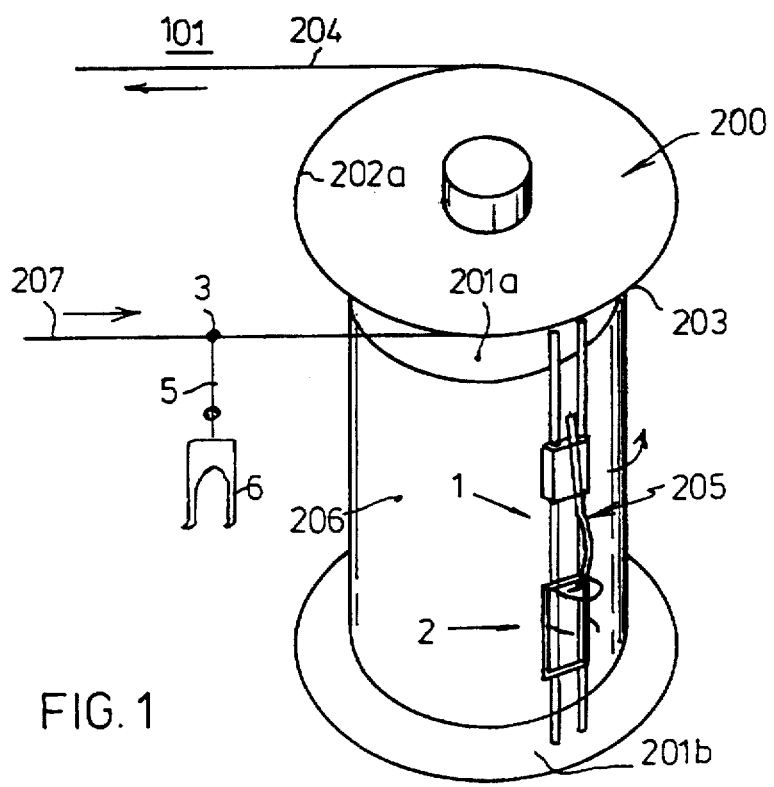
FIG. 1 schematically shows a carousel in which eviscerators and carcass holders according to an exemplary embodiment of the invention are mounted.
Figure 4:
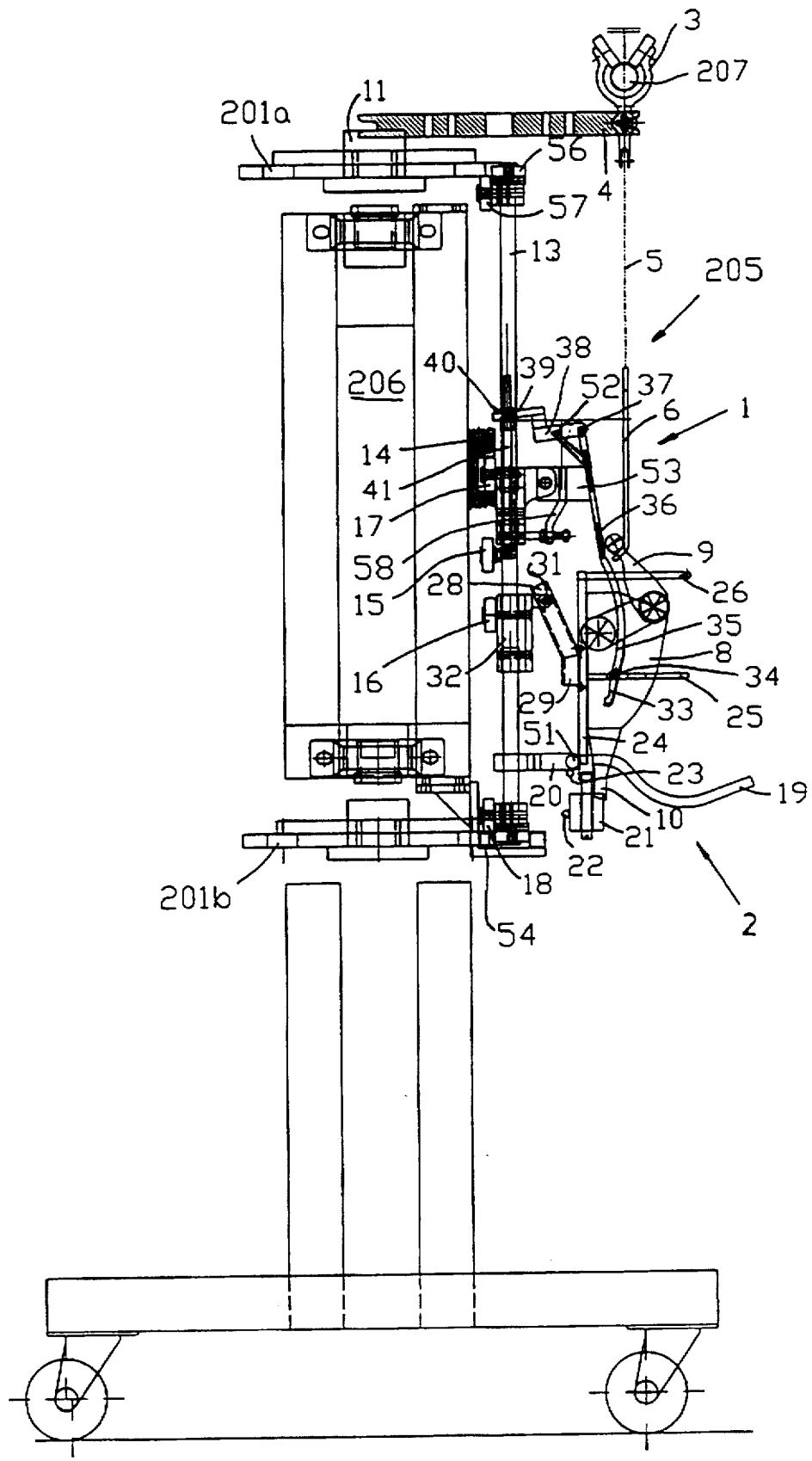
FIG. 4 schematically shows the arrangement of the unit in a vertical view.

The carousel 200 depicted in FIG. 1 comprises an upper and a lower turntable 201a, 201b, above and about which is mounted an overhead conveyor 207, having trolleys 3 from which a wire 5 depends, at the lower end of which a shackle 6 is attached, which has bracket supports for the two legs 9 of a carcass 8 (vide also FIG. 4). The carousel 200, which is depicted as circular but can have any roundgoing form, such as oval or elliptical, has a series of units 205, each comprising an eviscerator 1 and a carcass holder 2 placed at its circumference and rotatable by the turntable plates 201a, 201b. The overhead conveyor 2 arrives via an incoming path 202, runs around the carousel along path 203 and leaves the carousel via outgoing path 204, where an inspection station 101 for the inspection of the viscera and carcasses during their continued movement along the conveyor may be arranged (vide also FIG. 6B). The units 205 continue their journey along stand-by path 203a, in which they can be cleaned and brought into position for a next cycle. The carousel 200 further comprises a cylindrical core 206, which is stationary and is provided with a plurality of cam tracks (not shown) extending along its circumference for imposing the desired movement on the parts of the units 205 when they move along path 203 and 203a.

Figure 2:
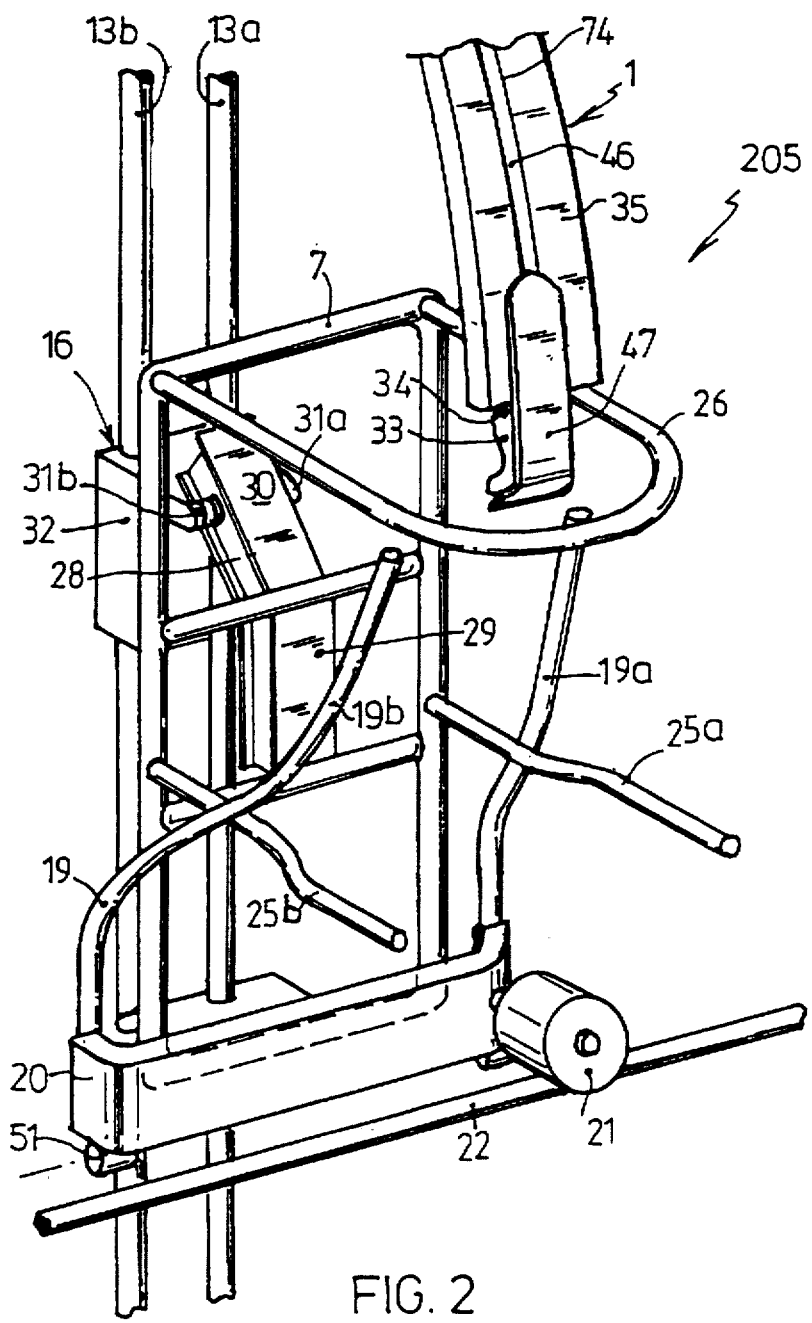
FIG. 2 shows a detail of a unit comprising an eviscerator and a cooperating carcass holder on the carousel of FIG. 1.

As can be seen in FIG. 2 and 4, the holder 2 of the unit 205 comprises a frame 7 which forms a support for the back of the carcass 8 and to the upper end of which is attached a horizontally outwardly extending U-shaped leg bracket 26. Two also horizontally outwardly extending armpit holders 25a and 25b are attached to the frame 7 approximately halfway along its height. At 51, a location below but in the vicinity of the carcass body, the frame 7 is hinged to support 20 for rotation about a horizontal axis perpendicular to the plane of the drawing of FIG. 4, which is also perpendicular to the plane of symmetry of the carcasses hanging on the shackles 6 with their legs 9 on either side of the leg bracket 26. The support 20 carries a breast holder 19, which comprises two rods 19a, 19b and possibly a V-shaped cap (not shown) therebetween. The breast holder 19 is also hingedly connected at 51 to the support 20 and furthermore provided with a depending cam block 21, which bears against bar-shaped guide 22, which extends along with the path 203 of travel and has circumferential portions which are located more outwardly to urge the cam block 21 outwards and upwards so as to move the breast holder 19 into firm engagement with the carcass 8. The holder 2 holds the carcass at the back as well as at the front and is pivotable about pivot 51 as a whole, as a consequence of which the carcass can positively and in a controlled manner be canted in two opposite directions.

An angled cam track 28 is attached to the inner side of the frame 7, providing cam track 29, in which cam 31 (FIG. 2) runs, which cam is attached to a support 32, which is itself provided with a cam roller 16 and can be moved up and down along vertical guides 13a, 13b which are mounted on the turntable plates 201a, 201b of the carousel, viz. at their upper end 56 to the turntable plate 201a and at their lower end 54 to the turntable plate 201b. In FIG. 4, the carousel is oval having two end turntable assemblies, only one of which is depicted. The units 205 are then guided within upper and lower rails extending between the two turntables and are provided for that purpose with upper guiding rolls 56, 57 and lower guiding rolls 18, 54. The rolls 18, 56 engage in mating recesses on the circumference of turntable plates 201a, 201b. Alternatively, the units 205 could be arranged on upper and lower driven chains.

The lower end of the eviscerator 1 is depicted from two different angles of view in FIG. 2 and 3. The higher parts can be seen in FIG. 4 ff. The eviscerator 1 comprises a more or less vertically extending bar 50, having a lower half 35 which is curved with the concave side oriented inwards and a straight upper half 36. A lever rod 46 extends along the outside of the bar 50—within a groove 74—and connects two scoop plates 33a, 33b, which are pivotally connected at 34 to the lower end of the bar 50, with a lever member 38, to which it is hingedly connected at 37. The bar 50, too, is hingedly connected to lever member 38, at a place (52) inwardly spaced from hinge 37. The bar 50 is moreover in a simple manner fixedly attached to support 53, which itself is hinged at 43 to a bracket 42, which is provided with a cam roller 17 at its inner side and is mounted on guides 13a and 13b for being moved up and down therealong. A rod 58 depends from the support 53 and is fixedly attached thereto. The rod 58 has a lower end in the shape of an eye 59, in which a bolt 60 is received, which is fixed to the bracket 42 via a support 61 and is provided with a nut 62 at its outer end, a coil spring 63 being positioned between the nut 62 and the lower end of the rod 58.

At its inner side 39 the lever member 38 is slidably received in a spacing 40, which is provided at the upper end of a bar 41 which is mounted on the guides 13a and 13b for being moved up and down along it. Spacing 40 is upwardly bounded by an adjustable platelet 59. The bar 41 is provided with a cam roller 15 on its inner side.

Figure 3A:
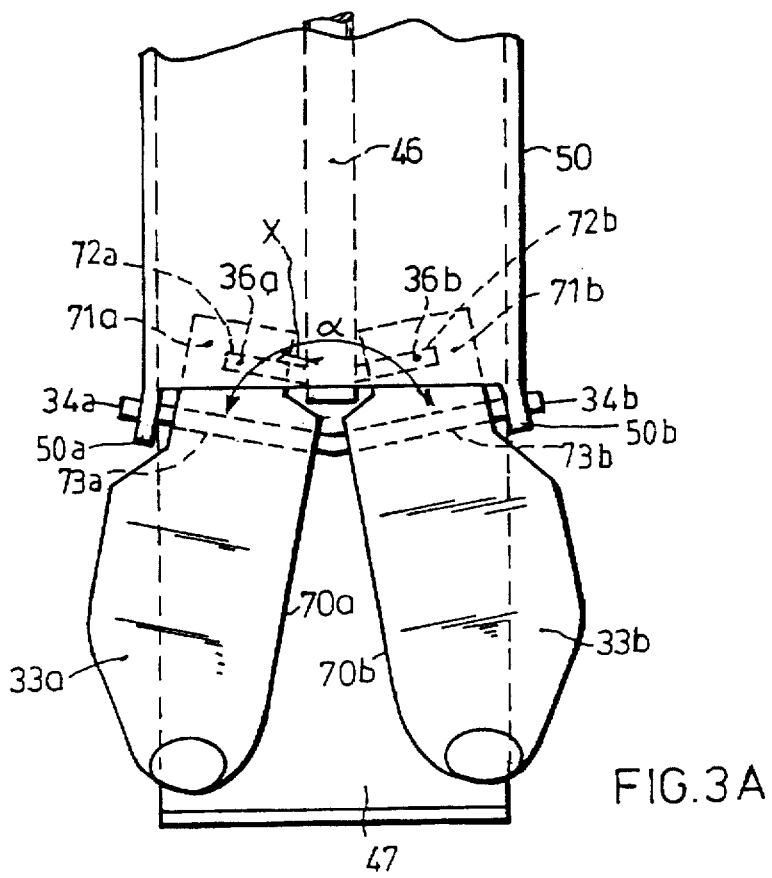
FIG. 3 shows in detail the lower end of the eviscerator of FIG. 2.
Figure 3B:
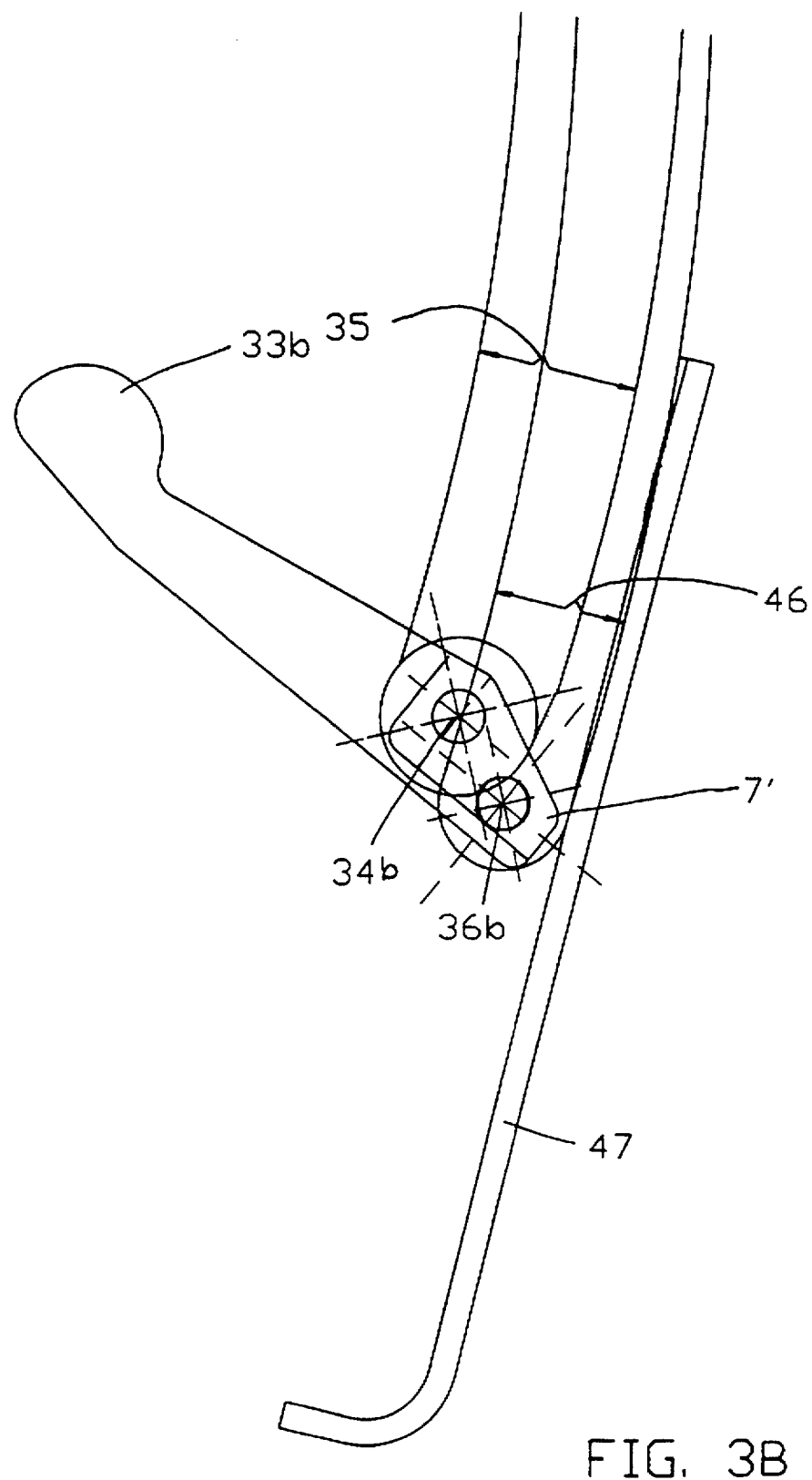

As can be seen in FIG. 3A and 3B, the scoop plates 33a and 33b are pivotally connected to the bar 50 at pivot axes 34a, 34b. The outer ends of pivot axes 34a, 34b are fixed in holes in lugs 50a, 50b, which are formed integral with the bar 50. The scoop plates 33a, 33b have bores 73a, 73b in which the pivot axes 34a, 34b are slidingly received. The pivot axes 34a, 34b are formed integral in a V-shape, including and angle (α) which is less than 180° degrees (here: 160°) as viewed in a (substantially) vertical plane of projection. Due to this orientation of the pivot axes 34a, 34b, the edges 70a, 70b of the scoop plates 33a, 33b will initially define a spread-out position, depicted in FIG. 3A, but when downward movement of the lever 46 causes them rototate over approximately slightly more than 90 degrees (see FIG. 3B), they will be adjacent to each other in order to positively clamp the gullet between them.

In order to rotate the scoop plates 33a, 33b about their pivot axes 34a, 34b, the lower end of the lever 46 is hingedly connected to extensions 71a, 71b of the scoop plates 33a, 33b by means of hinge pins 36a, 36b. Downward movement of the lever 46 causes the lower end of that lever to move downwards and outwards (during which movement the lever 46 will move out of the groove 74). As a consequence, the scoop plates 33a,33b will pivot around the hinges 36a, 36b and consequently rotate around the pivot axes 34a, 34b. The hinge pins 36a, 36b are fastened to the lever 46 and are received with clearance in holes 72a, 72b in extension 71a, 71b. The pins 36a, 36b include an angle of less than 180° (here: 155°) and can move within the holes 72a, 72b during the pivoting movement of the scoop plates from the active to the inactive position and vice versa. In addition, the distance "x" between the entry of a hole 72a, 72b and the lever 46 is sufficient to allow for the approach of the extension 71a, 71b and the lever 46 during pivoting movement towards the active position.

The scoop plates 33a, 33b are shielded at their convex side by a shield plate 47 which is fastened to the lower end of the lever 46 in any suitable way.

The operation of the eviscerator 1 will now be explained with reference to the FIG. 5A–5I.

The carcass 8 is that of a bird from which the head may have been removed, so that its lower end is formed by its neck 10, and which has been suspended with its legs 9 in the shackle 6, with its back towards the core 206. The vent opening 80 located near the legs 9 has been previously made by means of a vent cutter and has been extended by an incision made by a cutter to facilitate the entry of the eviscerator 1.

Figure 5A:
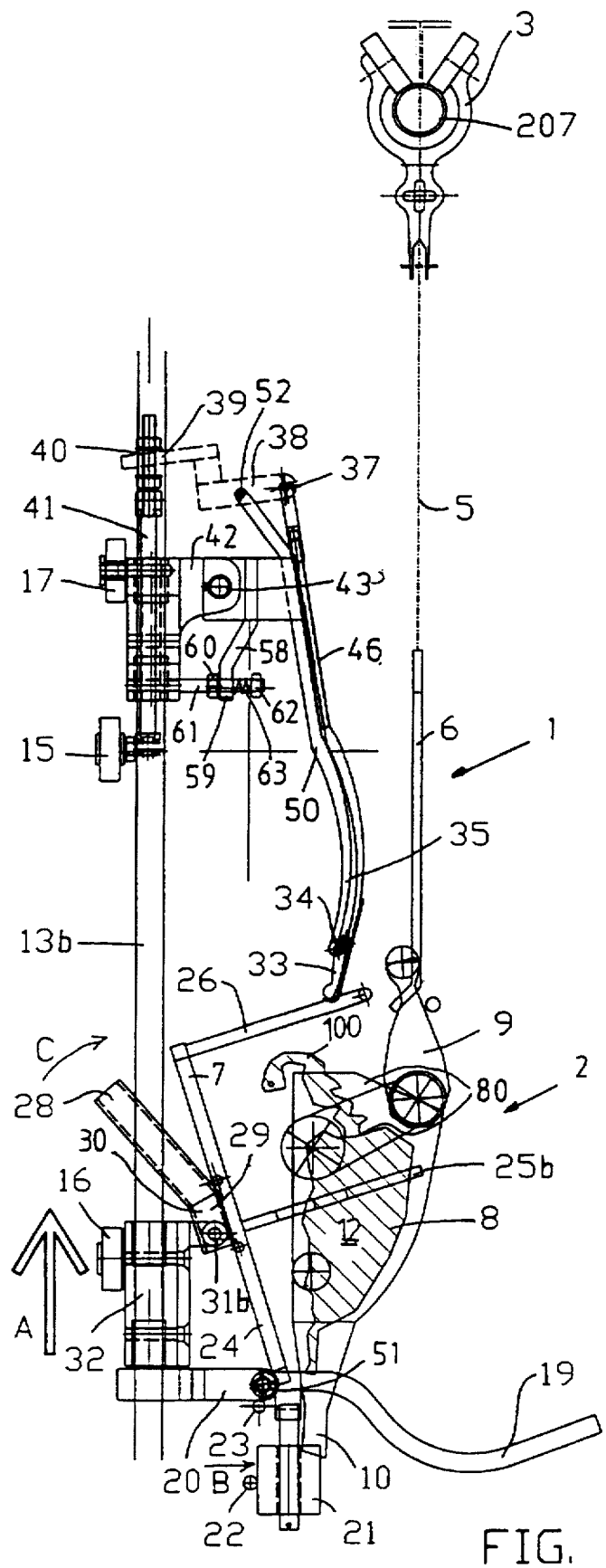
FIG. 5A-I show a sequence of steps in the evisceration of a carcass with the aid of the arrangement of FIG. 1-4.
Figure 5B:
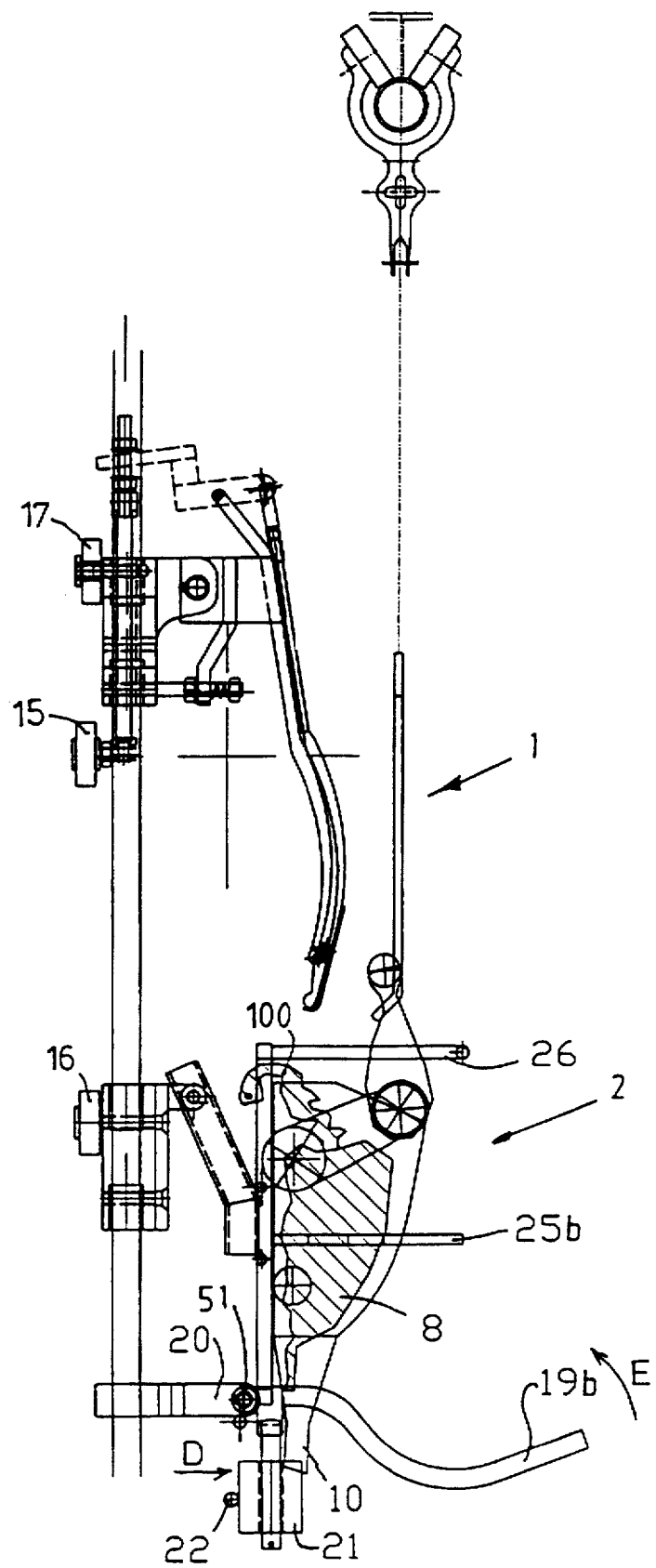
Figure 5C:
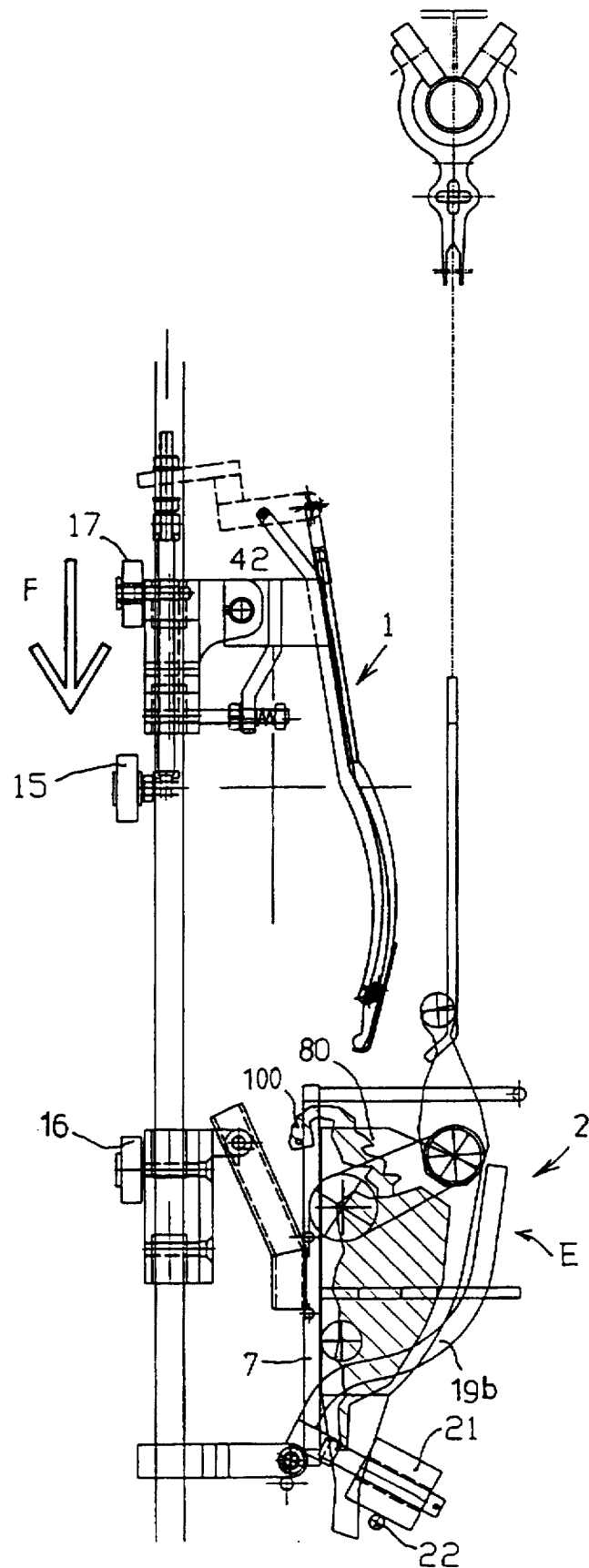
Figure 5D:
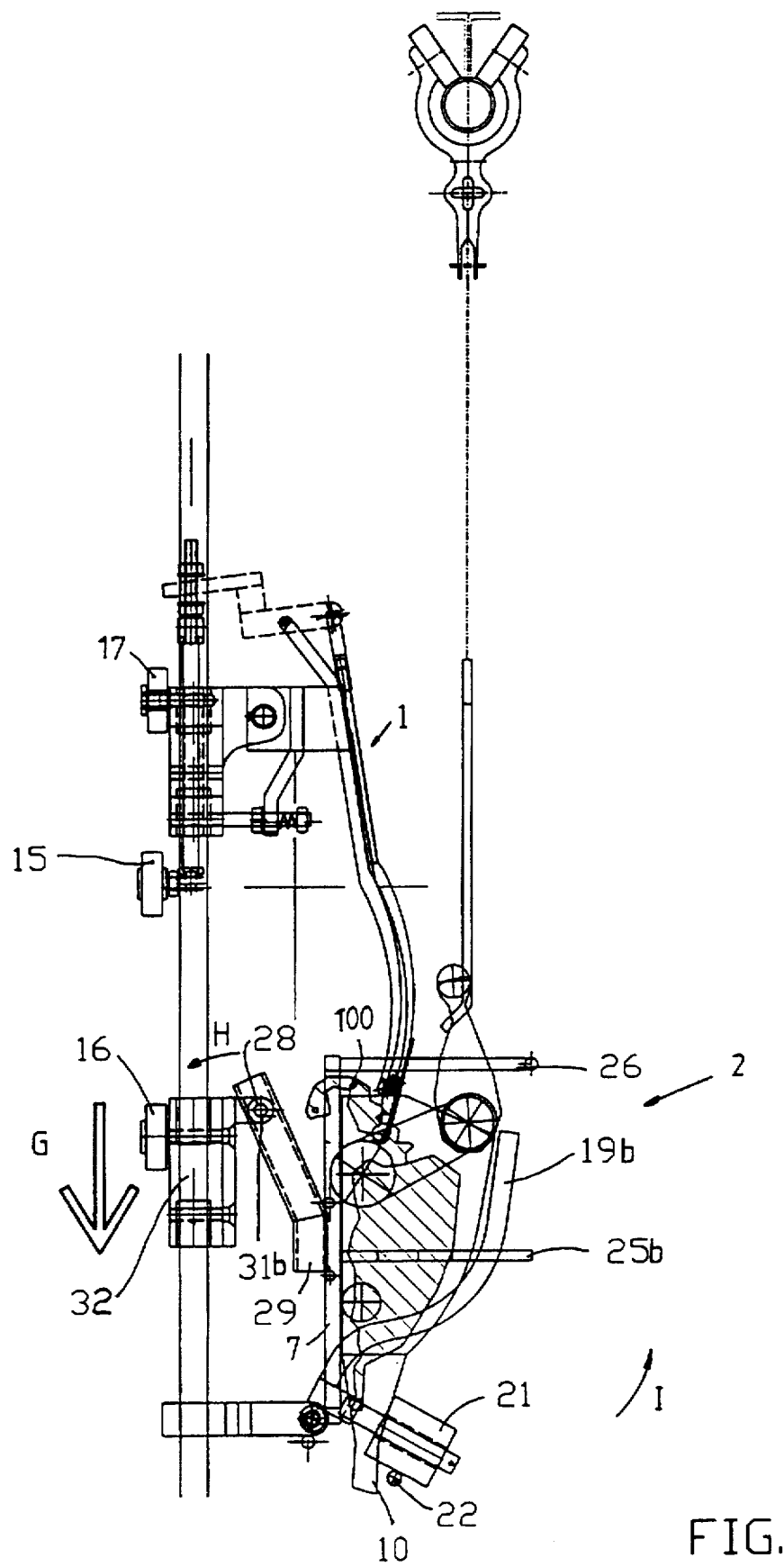

First, the holder 2 is placed to hold the carcass at the back as well as at the breast side. In FIG. 5A the support 32 is urged upward (direction A) due to the influence of a cam track (not shown) on the stationary core 206 of the carousel. As a result, the cam 31 is urged in the direction B to travel along the cam tracks 29 and 30. Due to the hinged mounting of the frame 7 at 51, this frame will be pivoted outwards in the direction C to place the leg bracket 26 between the legs 9 and to place the rods 25a,25b on either side of the carcass in the arm pits. Next, as can be seen in FIG. 5B and 5C, the guide 22 urges the block 21 outwards in the direction D and due to the hinged mounting of the breast holder 19 at 51, the breast holder rods 19a, 19b are rotated in the direction E to the position depicted in FIG. 5C, in which they press the carcass against the frame 7. The support 20 remains at the same height during the complete travel along path 203, 203a. The carcass is now firmly held in position between the frame 7 and the rods 19a, 19b.

At the same time, the cam track 14 (vide FIGS. 4 and 5C) for the cam roller 17 urges the cam roller 17 downward in the direction F, to allow the eviscerator to approach the vent opening 80 of the carcass. Likewise, the cam roller 16 is moved downwards, so that the eviscerator 1 maintains its orientation and state, but at a lower level. At the moment at which the lower end of the eviscerator reaches below the breast tip, the cam track of the cam roller 16 urges this roller, and thereby the support 32, downwards in the direction G, so that the cam 31 moves in its cam tracks 30 and 29 to the position depicted in FIG. 5E, so that the frame 7 is pivoted back in the direction H. At the same time, the guide 22 urges the block 21 further in the direction E, so that the grip which is exerted by the frame 7 and the breast holder 19 is not weakened. As a result of all this, the carcass 8 is also pivoted along in the direction H, due to which the lower end of the eviscerator will move (relatively) in the vent opening 80 towards the breast side of the carcass.

Figure 5E:
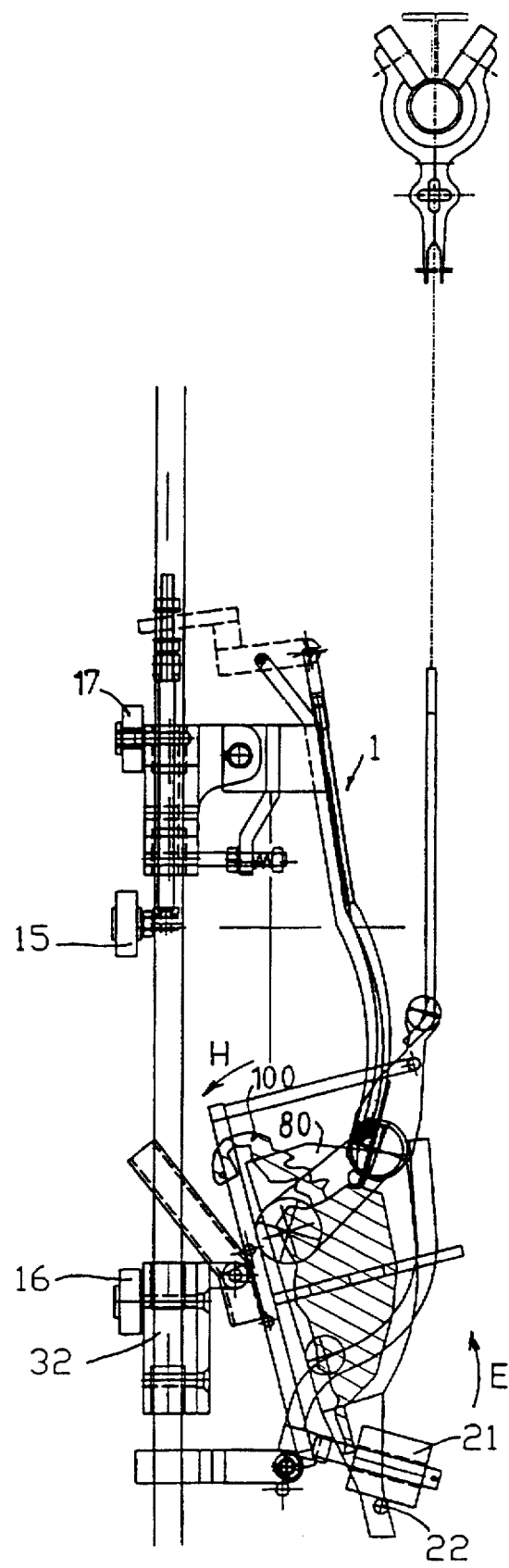
Figure 5F:
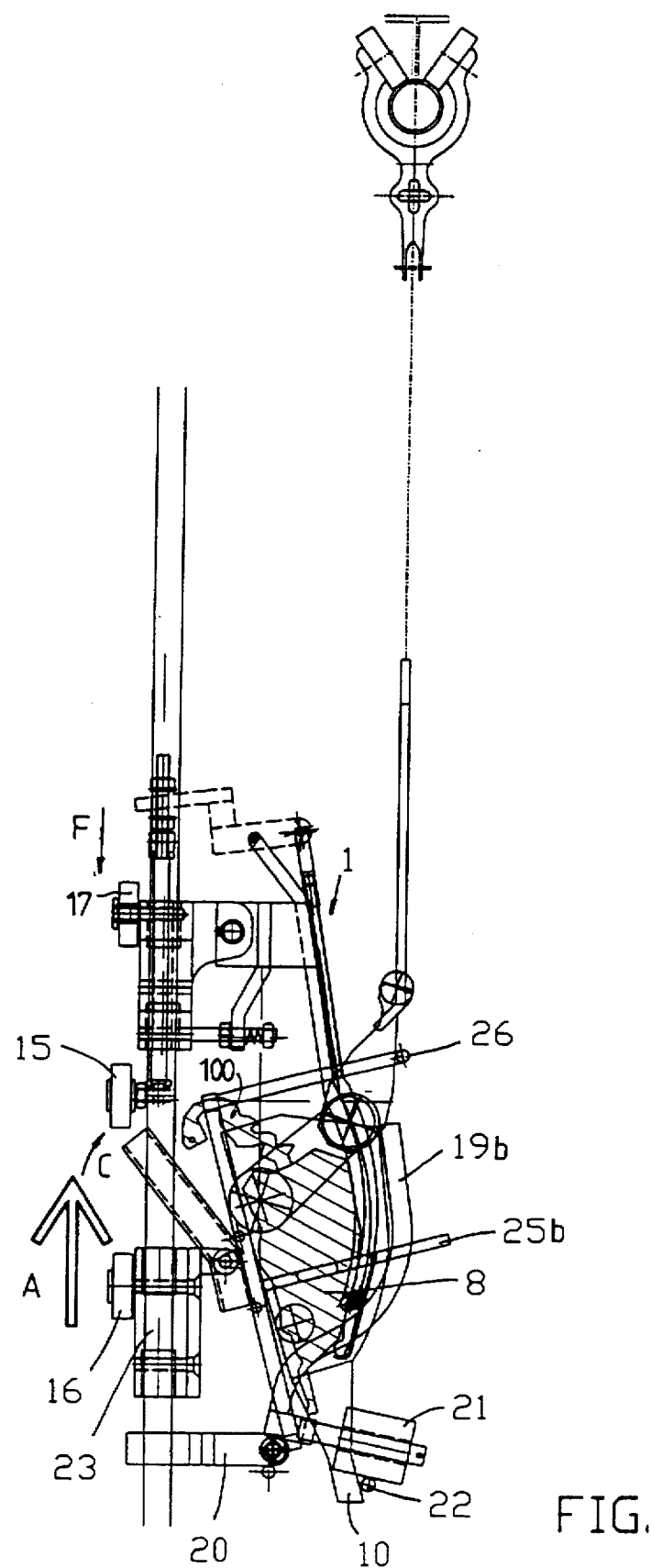

Next, as can be seen in FIG. 5E, 5F, the cam track 14 urges the cam roller 17 further downward in the direction F, so that the lower end of the eviscerator 1 travels along the inner side of the breast towards the lower part of the carcass 8. The presence of the shield plate 47 enhances the penetration of the eviscerator 1, since it prevents parts of the inside of the carcass from entering the wide V-shaped space between edges 70a, 70b of the scoop plates.

When the lower end has arrived near the crop in the carcass 8, the cam track for cam roller 16 urges this roller upward again over a small distance in the direction A, so that the frame 7 will again be pivoted to some extent in the direction C. The same movement is allowed by the course of guide 22 for block 21 and thereby breast holder 19. As a result, the carcass is slightly canted outwards in a fully controlled manner, and remains held within the holder. Due to the canting movement, the lower end of the eviscerator 1 will smoothly follow the inner contours of the breast and get below and behind the glandular stomach and aside the gullet, although it itself only performs a vertical movement.

Figure 5G:
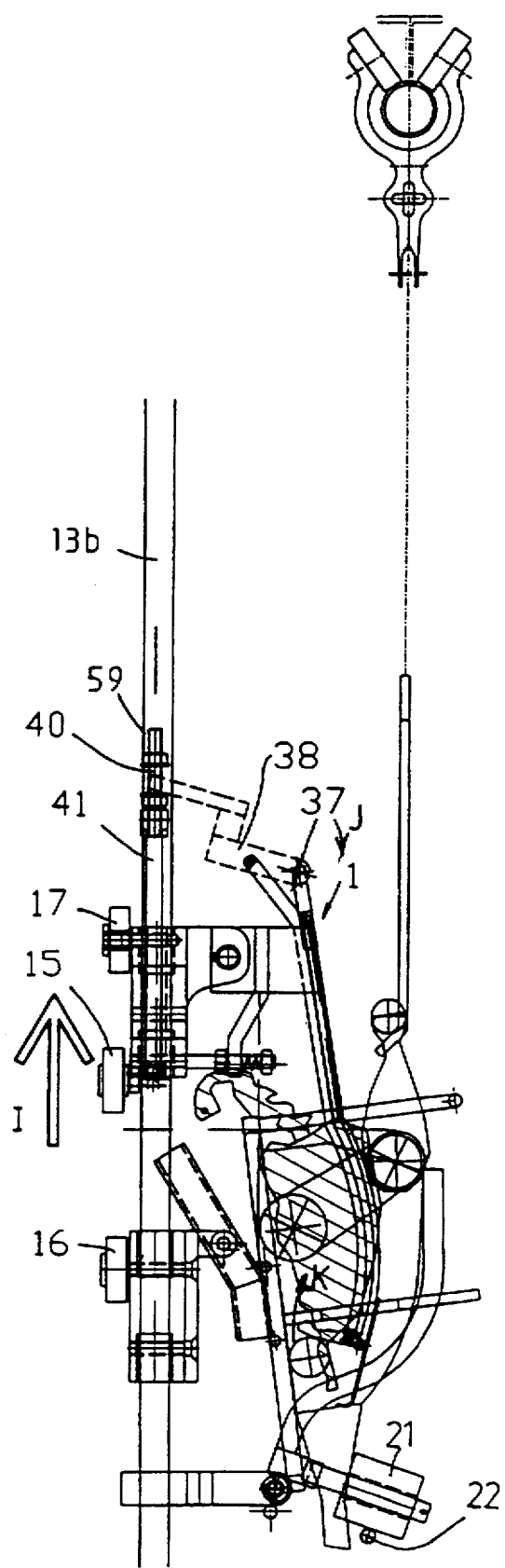

Subsequently, as can be seen in FIG. 5G the cam track (not shown) for the cam roller 15 urges the cam roller 15 upwards in the direction I, due to which the inner end of the lever member 38 will be urged upwards. Since, however, the cam roller 17 remains at the same level, the upper end 52 of the bar 50 remains in its position, the lever member will pivot about hinge 52 so that its outer end is urged downward in the direction J. This causes the lever rod 46 to slide downward along the outer side of the bar 50 and to rotate the scoop plates 33a,33b in the direction K towards their active position in which they engage (e.g. scoop) under the viscera and engage (e.g. clamp) the gullet between their edges 70a, 70b and are oriented to perform a scooping action.

Figure 5H:
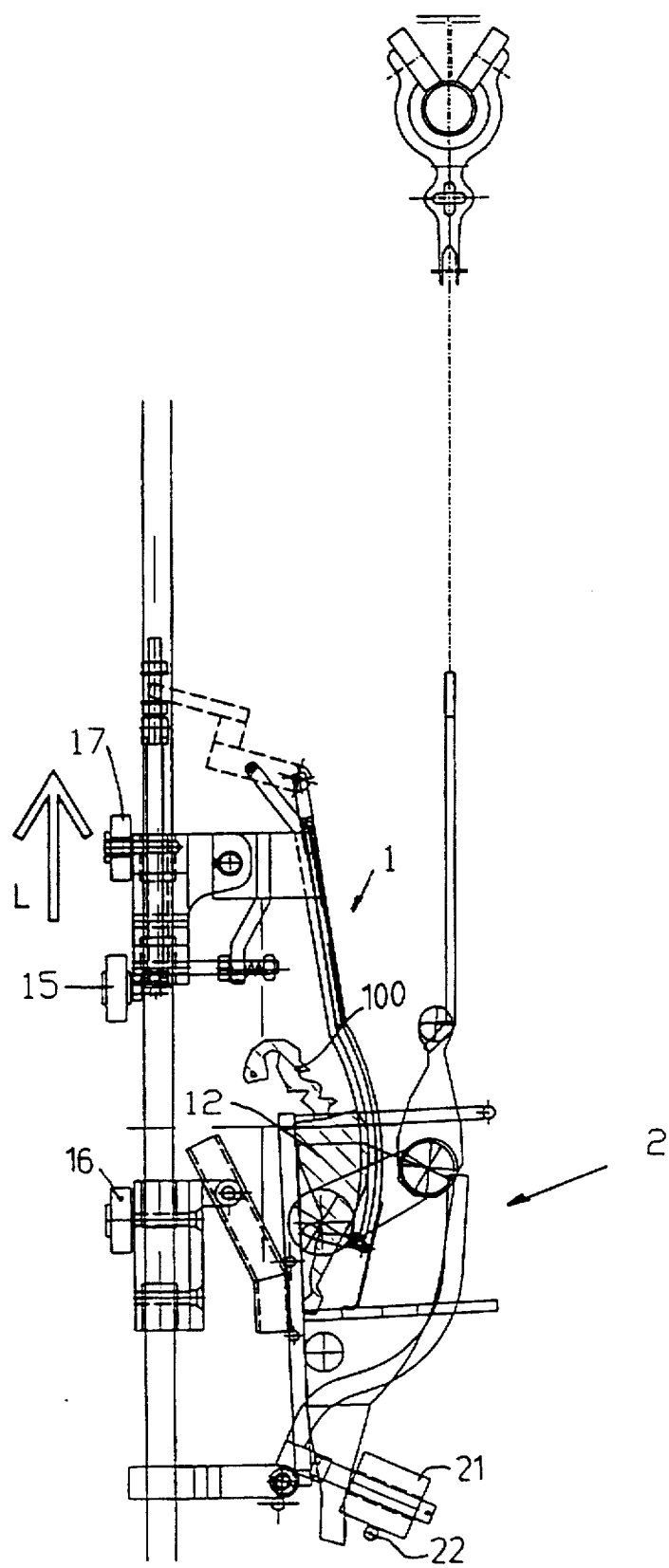

Then, the cam rollers 15 and 17 are simultaneously and to the same extent urged upwards in the direction L by their respective cam tracks, so that the eviscerator 1 is seized. The scoop plates 33a, 33b, engaging the viscera in a scooping motion from below, will push the viscera 12 upwards through the cavity of the carcass 8 so that it will exit the carcass through the (enlarged) vent opening 80 (FIG. 5H). The gullet 100, which is still clamped between the scoop plates 33a, 33b, will break so that the clamped portion of the gullet 100 becomes detached from the carcass 8. The spring-biassed bearing at 59–63 enables a slight outward pivoting movement of the bar 50 against the restoring force of the spring 63, which allows the bar 50, in particular the rounded ends of the scoop plates, to move along the uneven surface of the spine/rib area of the inner side of the back of the carcasss. In addition, although it is not shown explicitly, it is possible to design the course of the cam tracks for the roller 17 and the guide 22 for the block 21 such that a slight, fully controlled, canting movement in the direction H is imposed on the carcass by the holder 2, at the point in path 203 where the scoop plates 33a, 33b have reached the midriff, which is comparatively thick. After the scoop plates will have passed upwards along this midriff, this intermediate canting movement can be reversed again.

Figure 5I:
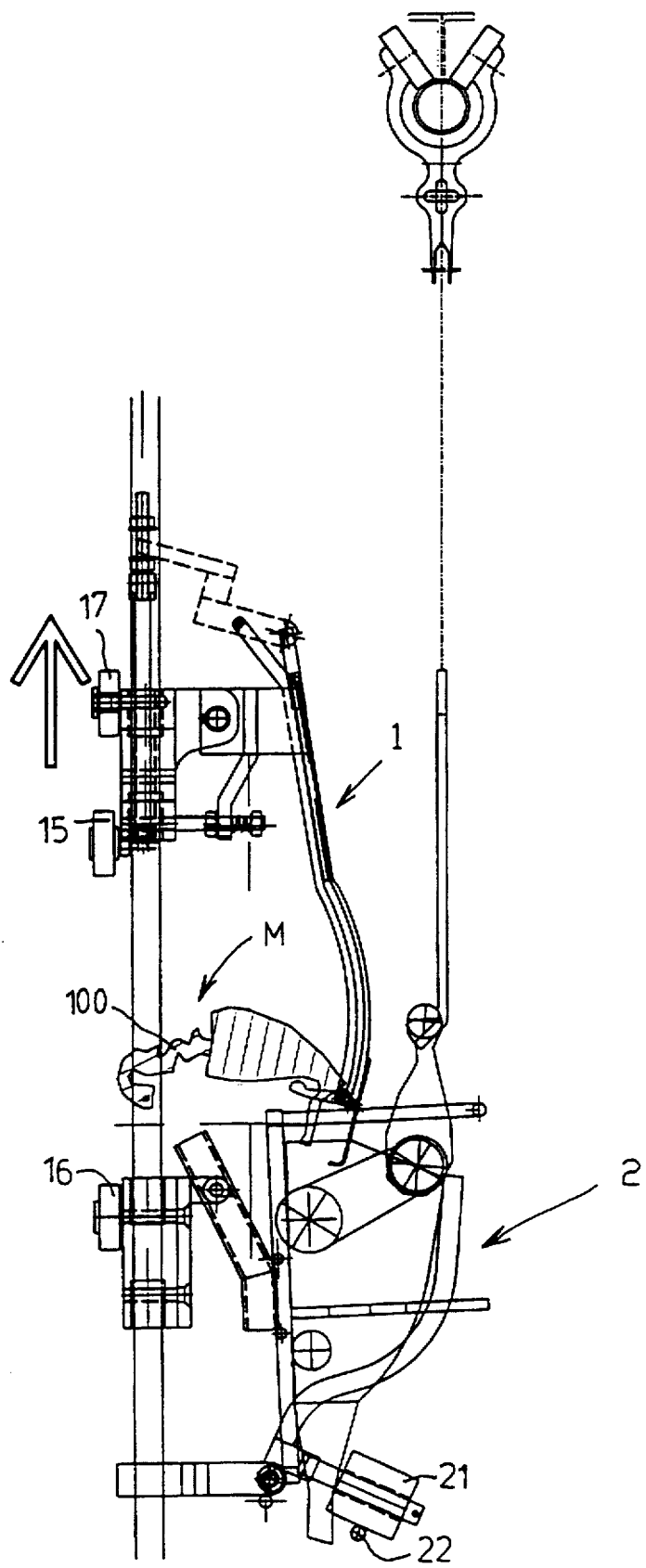

As can be seen in FIG. 5I, after having left the vent opening 80 the viscera 12 tends to fall down in the direction M. At that moment, the trolley has arrived at the outgoing path 204, which diverges from the path 203a which is followed by the units 205. The scoop plates 33a,33b are maintained in their clamping position for a (very) short while, to space the viscera from the outside of the carcass and to enable the frame 7 and the breast holder 19 to be canted inwards and outwards, resp., under the action of their cam tracks, so as to release the carcass and to enable the conveyor to further transport the carcass. Then, the cam roller 15 is urged downwards in the direction N, so that the lever member 38 is canted back and the lever bar 46 slides upwards again to some extent, whereby the scoop plates 33a, 33b rotate back towards the shield plate 47 and release the gullet 100.

Figure 6A:
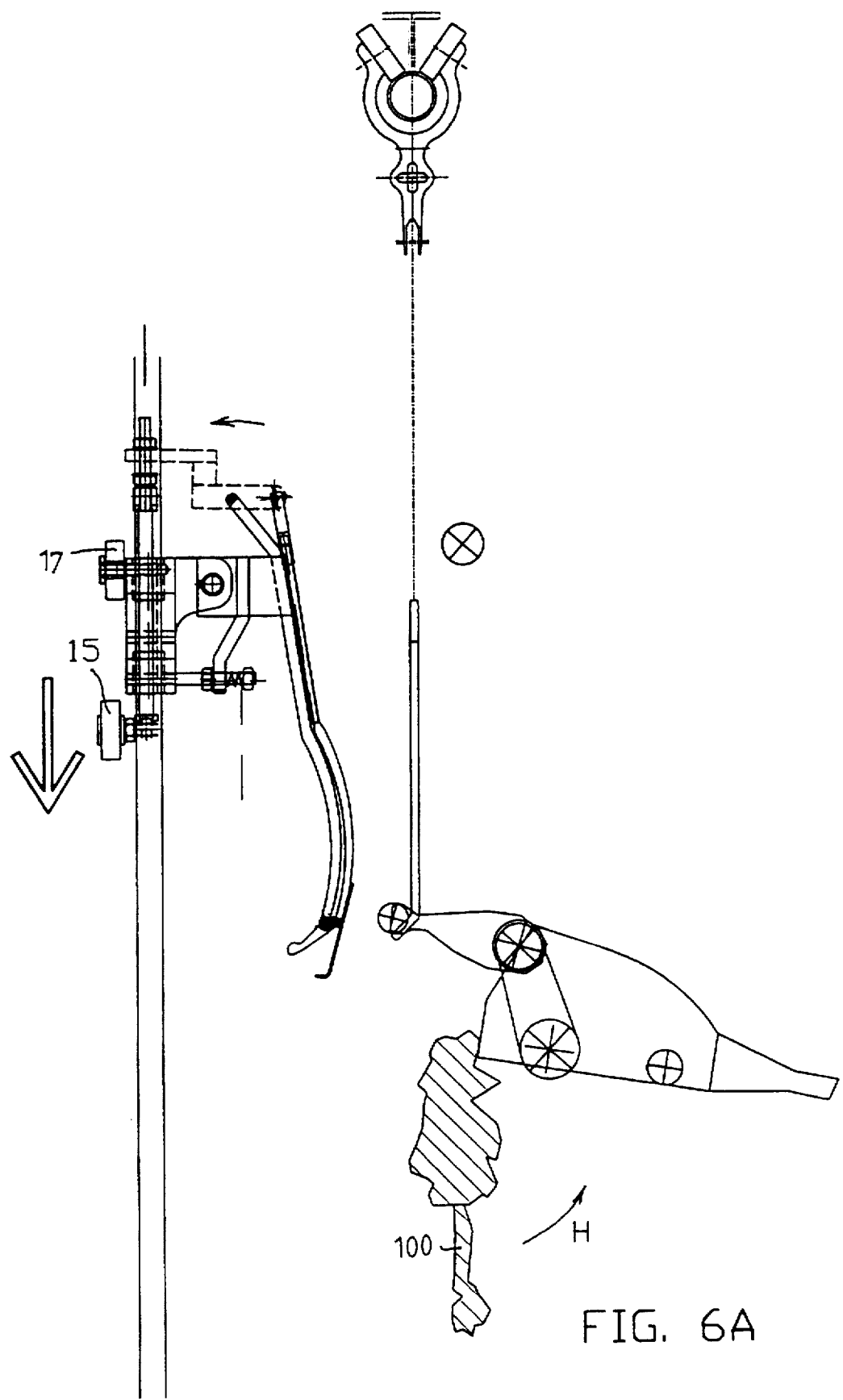
FIG. 6A-B show the carcass and eviscerator after completion of the evisceration, the carcass and viscera being positioned for inspection purposes.

The units 205 continue their movement along the carousel towards the incoming path of the overhead conveyor. In the mean time, the scoop plates are brought into the position shown in FIG. 6A, in which they can be easily cleaned with a spray cleaning solution.

Figure 6B:
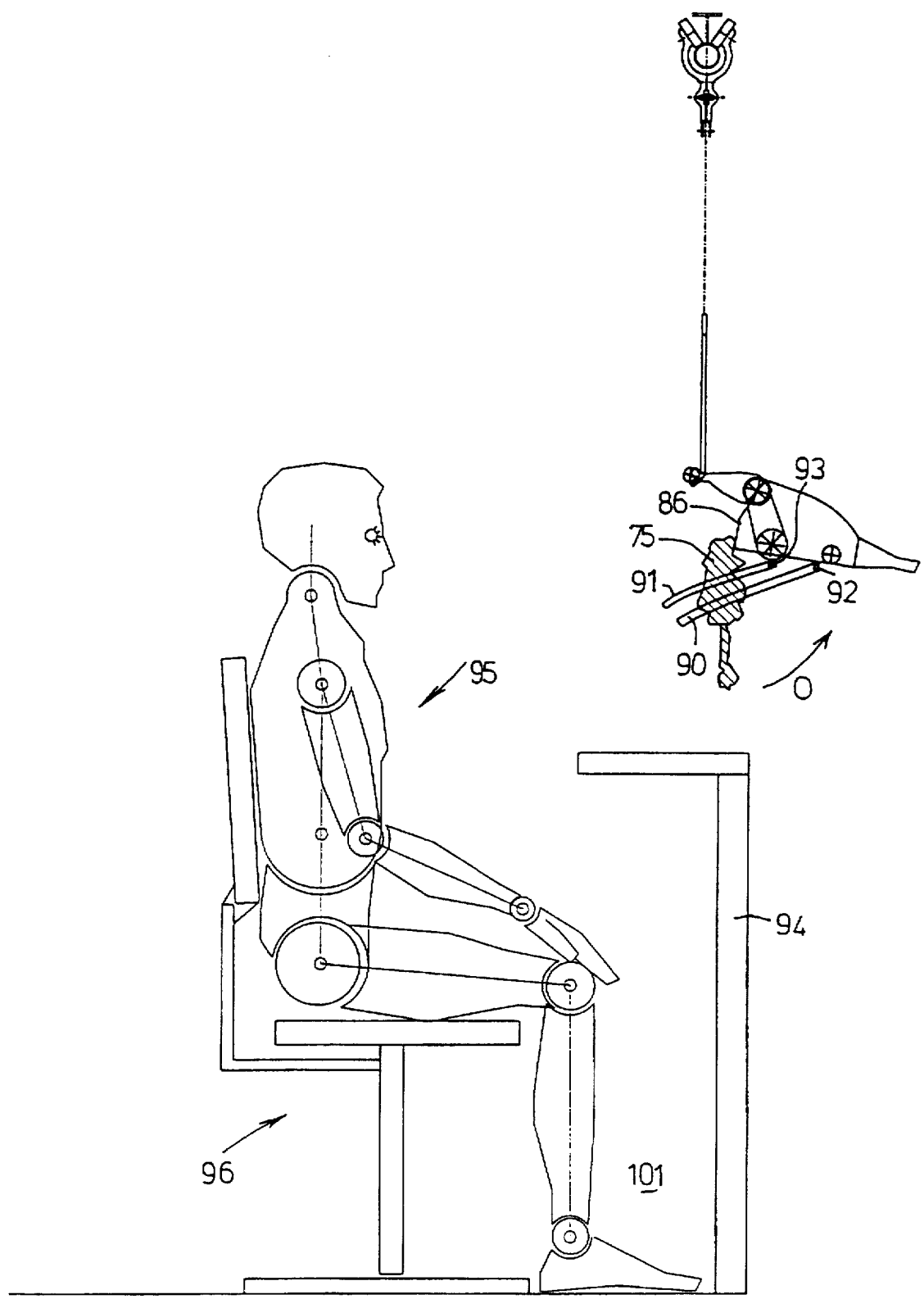

Almost immediately after the release of the carcass from the holder 2, the carcass and viscera are moved along an inspection station 101, depicted in FIG. 6B. At the beginning of the outgoing path 204 stationary, rod-shaped guides 90 and 91 are arranged at a level and in such a mutual relationship that the breast side of the carcass, which still hangs from the shackle 6, is canted upwards in the direction 0. The viscera remains in its vertical position, hanging down from the carcass and connected thereto by the abdominal fat. The guides smoothly merge into stationary rod-like supports 92 and 93, which support the carcass in the substantially horizontal orientation depicted in FIG. 6B. The inspector 95 is situated at 96 at the inspection station 100 and can have a good look at the viscera and the carcass, in particular the inside thereof through the (enlarged) vent opening 80. There is no risk of contamination of the outside of the carcass by the viscera.

While a preferred embodiment of the invention has been illustrated and disclosed, it will be apparent to those skilled in the art that variations and modifications thereof can be made without departing from the spirit and scope of the following claims.

We claim:

1. A device for removing the viscera from the carcass of a slaughtered bird, comprising a carrier bar means, means for holding the carcass with its vent upward, means for gripping the gullet of the carcass, said means for gripping the gullet comprising at least two jaw members which are movable towards each other to fixedly and positively clamp the gullet between the jaw members, means for engaging under the viscera, means for moving the gripping means and the engaging means downward inside the carcass to the gullet and operating means to move the gripping means and the engaging means subsequently in an active position upwards to eviscerate the viscera, wherein the gripping means and the engaging means are formed by one scoop member which is hingedly connected to a lower end of the carrier bar means, wherein the gripping means and the engaging means are arranged for being simultaneously rotated between a non-active position and an active position and vice versa.

2. A device according to claim 1, wherein the gripping means and the engaging means are arranged for simultaneously performing a common rotational movement.

3. A device according to claim 2, wherein the arrangement is such that the simultaneous rotation takes place around an axis or axes which extends or extend substantially perpendicular to the plane of symmetry of the carcass to be eviscerated.

4. A device according to claim 3, wherein the scoop member comprises at least two scoop parts forming two cooperating jaw members and being each pivotally connected to the carrier bar means, said carrier bar means extends substantially vertically, the pivot axes of said scoop parts including an upwardly opening angle of less than 180°, as viewed in a substantially vertical plane of projection.

5. A device according to claim 4, wherein the scoop parts are pivotally mounted on pivot axes and have edges which face each other, said edges extend substantially perpendicular to the respective pivot axis of the respective scoop parts, wherein in their non-active position, the scoop parts extend substantially vertically downward from their pivot axes, and, in their active position, extend substantially horizontally from their pivot axes, the said edges juxtaposed each other in the latter position, thus providing a positive gullet clamping force.

6. A device according to claim 5, further comprising operating means for the scoop parts, said operating means comprising lever means which extend along the carrier bar means and are hingedly connected at lower end portions of the scoop parts, said lower end portions located at opposite sides of their pivot axes from the gripping means and engaging means.

7. A device according to claim 6, wherein the lever means comprises one lever for all scoop parts.

8. A device according to claim 5, wherein the carrier bar means is substantially curved as seen in a vertical plane to the plane of symmetry of the carcass, wherein said scoop parts have their active position at the concave side of the carrier bar means.

9. A device according to claim 5, wherein the moving means and the holding means are arranged so as to enable the scoop parts to be inserted in the carcass along the inner side of the breast of the carcass and to be seized along the inner side of the back of the carcass.

10. A device according to claim 8, wherein the carrier bar means is provided with a shield member for screening off the scoop parts when the scoop parts are in a non-active position at the convex side of the carrier bar means.

11. A device according to claim 8, wherein the holding means comprise means for engaging the back of the carcass and means for engaging the breast of the carcass and further comprise means for canting the carcass during the downward and upward movement of the scoop parts.

12. A device according to claim 11, wherein the holding means are arranged for a canting movement about an axis which is located below the carcass body, in the vicinity of the neck of the carcass.

13. A device according to claim 11, wherein the moving means comprises means for moving the scoop parts substantially vertically along a straight line.

14. A device according to claim 13, wherein the scoop parts are connected to the moving means to allow the scoop parts to be resiliently urged out of the way by the carcass.

15. A device according to claim 11, further comprising means for relating activation of the canting means to activation of the moving means and to activation of the operating means for the scoop parts.

16. A device according to claim 15, wherein the relating means are adapted for activating the canting means to cant the back of the carcass slightly away from the scoop parts when the scoop parts arrive at the midriff.

17. An assembly of a plurality of devices according to claim 1, wherein the assembly comprises the devices being arranged on a unit for being moved along a predetermined roundgoing path, the devices are provided with cams and the unit is provided with cam curves cooperating with said cams to operate the means of the devices at specific locations along the path, wherein the cam curves for the holding means comprise a stand-by trajectory in which the holding means are brought in a non-active position, wherein the cam curve for the operating means for the scoop parts comprises a trajectory in which the scoop parts are brought in an active position, which trajectory partly coincides with said stand-by trajectory.

18. An assembly of a plurality of devices according to claim 1, wherein the assembly comprises the devices being arranged on a unit for being moved along a predetermined roundgoing path, an overhead conveyor for shackles for the legs of the carcasses of poultry, said conveyor extending along an incoming trajectory to bring the shackles to the unit, along at least a part of said pre-determined roundgoing path and subsequently along an outgoing path diverging from said roundgoing path to move the shackles away from the unit, and tilting means located at the outgoing path for tilting the carcasses depending from the shackles towards an inclined orientation while the carcasses are moved along the conveyor.

19. An assembly according to claim 18, further comprising support means located at the outgoing path for supporting the carcasses in their tilted orientation.

20. An assembly according to claim 18, wherein the tilting means are arranged to tilt the carcasses such that the lower end of each carcass is moved away from the unit.

21. An assembly according to claim 18, wherein the tilting means are arranged to tilt the carcasses towards an approximate horizontal orientation.

22. An assembly according to claim 18, wherein the tilting means and the support means are stationary.

23. An assembly according to claim 18, further comprising an inspection station coinciding with the tilting means and the support means.

24. A device for removing the viscera from the carcass of a slaughtered bird, comprising:
   carrier bar means;
   at least two gripping members pivotally mounted to said carrier bar means;
   actuator rod means for pivoting said gripping members between first positions spaced from each other to form a slot therebetween to receive the gullet of a bird and substantially coextensive with said carrier bar means, and second positions juxtaposed each other to close the slot about the gullet of a bird and substantially normal to said carrier bar means; and
   whereby the carrier bar means is inserted into the visceral cavity of a bird with the gripping members substantially coextensive with the carrier bar means so that the slot between the gripping members is positioned adjacent the gullet of the bird, the actuator rod means pivots the gripping members from spaced first positions coextensive with the carrier bar means to second positions closed about the gullet and substantially normal to the carrier bar means and beneath the viscera of the bird, and the carrier bar means and gripping members are withdrawn from the visceral cavity to draw the viscera and gullet from the visceral cavity of the bird.

25. A device for removing the viscera from the visceral cavity of an inverted slaughtered bird, comprising:
   a carrier bar sized and shaped for insertion downwardly into the visceral cavity of a slaughtered bird;
   a pair of scoop plates mounted in side-by-side spaced relationship;
   pivot axes pivotally mounting said pair of scoop plates to said carrier bar, said pivot axes including a pair of legs formed in a V-shape with one scoop plate pivotally mounted to one leg of said pivot axes and the other scoop plate pivotally mounted to the other leg of said pivot axes, so that said scoop plates are separated from each other and can receive therebetween a gullet of a bird when said scoop plates extend parallel to said carrier bar and are juxtaposed each other and can grip therebetween the gullet of a bird when said scoop plates are tilted to positions normal to said carrier bar;
   a lever rod extending adjacent said carrier bar and operatively connected at one of its ends to said pair of scoop plates for tilting said scoop plates between their positions parallel to said carrier bar and normal to said carrier bar;
   so that the carrier bar and scoop plates are moved downwardly into the visceral cavity of a bird until the scoop plates reach the viscera of the bird, the lever rod is actuated to tilt the scoop plates from spaced apart positions parallel to the carrier bar to juxtaposed positions normal to the carrier bar and to grip a gullet of the bird between the scoop plates, and the carrier bar and scoop plates are withdrawn upwardly out of the visceral cavity of the bird with the scoop plates positioned normal to the carrier bar and drawing out of the visceral cavity the viscera and gullet.

26. A device according to claim 25, wherein the scoop plates are arranged for simultaneously performing a common rotational movement.

27. A device according to claim 26, wherein the common rotational movement of the scoop plates is such that the rotational movement of each scoop plate takes place around an axis which extends substantially perpendicular to the plane of symmetry of the bird to be eviscerated.

28. A device according to claim 25, wherein the pivot axes of said scoop plates form an upwardly opening angle of less than 180°, as viewed in a substantially vertical plane of projection.

29. An assembly of a plurality of devices according to claim 24, wherein the assembly comprises the devices being arranged on a unit for being moved along a predetermined roundgoing path, the devices are provided with cams and the unit is provided with cam curves cooperating with said cams to operate means of the devices at specific locations along the path, wherein the cam curves for the holding means comprise a stand-by trajectory in which the holding means are brought in a non-active position, wherein the cam curve for the operating means for the scoop parts comprises a trajectory in which the scoop parts are brought in an active position, which trajectory partly coincides with said stand-by trajectory.

30. An assembly of a plurality of devices according to claim 24, wherein the assembly comprises the devices being arranged on a unit for being moved along a predetermined roundgoing path, an overhead conveyor for shackles for the legs of the carcasses of poultry, said conveyor extending along an incoming trajectory to bring the shackles to the unit, along at least a part of said pre-determined roundgoing path and subsequently along an outgoing path diverging from said roundgoing path to move the shackles away from the unit, and tilting means located at the outgoing path for tilting the carcasses depending from the shackles towards an inclined orientation while the carcasses are moved along the conveyor.

* * * * *